US012637219B2

(12) United States Patent
Cotoner et al.

(10) Patent No.: US 12,637,219 B2
(45) Date of Patent: May 26, 2026

(54) PASSENGER SEAT TRAY TABLE

(71) Applicant: B/E Aerospace, Inc., Winston-Salem, NC (US)

(72) Inventors: Krisha Chrystelle Singson Cotoner, Tanauan City (PH); Angelica Macalintal Jusi, Tanauan City (PH)

(73) Assignee: B/E Aerospace, Inc., Winston-Salem, NC (US)

( * ) Notice: Subject to any disclaimer, the term of this patent is extended or adjusted under 35 U.S.C. 154(b) by 189 days.

(21) Appl. No.: 18/410,248

(22) Filed: Jan. 11, 2024

(65) Prior Publication Data

US 2024/0239491 A1    Jul. 18, 2024

(30) Foreign Application Priority Data

Jan. 16, 2023    (EP) ..................................... 23151832

(51) Int. Cl.
B64D 11/06          (2006.01)

(52) U.S. Cl.
CPC ...... B64D 11/0638 (2014.12); B64D 11/0644 (2014.12)

(58) Field of Classification Search
CPC ........... A47B 3/063; A47C 7/624; A47C 7/68; A47C 7/70; B64D 11/0638; B64D 11/0644
USPC .................................. 297/411.31, 411.3, 145
See application file for complete search history.

(56) References Cited

U.S. PATENT DOCUMENTS

| | | | | | |
|---|---|---|---|---|---|
| 2,518,381 | A | * | 8/1950 | Runkles | A47C 7/70 |
| | | | | | 297/145 |
| 2,845,113 | A | * | 7/1958 | Keel | A47C 7/70 |
| | | | | | 297/145 |
| 3,298,735 | A | * | 1/1967 | Berman | A47C 7/70 |
| | | | | | 297/145 |
| 3,366,430 | A | * | 1/1968 | Diedrich | A45D 44/02 |
| | | | | | 297/411.31 |
| 3,583,760 | A | * | 6/1971 | McGregor | B64D 11/0627 |
| | | | | | 297/145 |
| 3,632,161 | A | * | 1/1972 | Arfaras | A47C 7/70 |
| | | | | | 297/145 |

(Continued)

FOREIGN PATENT DOCUMENTS

| | | |
|---|---|---|
| DE | 102020207763 A1 | 12/2021 |
| EP | 1172252 A1 | 1/2002 |

(Continued)

OTHER PUBLICATIONS

Extended European Search Report dated Jun. 14, 2023; European Application No. 23151832.5.

*Primary Examiner* — Jose V Chen
(74) *Attorney, Agent, or Firm* — Suiter Swantz IP

(57)        ABSTRACT

A passenger seat assembly for an aircraft includes a seat having a front side and a back side separated from one another in a depthwise direction, and a first lateral side and a second lateral side separated from one another in a widthwise direction; and an armrest located at one of the first lateral side or the second lateral side of the seat. The armrest includes a tray table movable between a stowed configuration and a deployed configuration. A position of the tray table is adjustable, relative to the seat, in the depthwise direction and in a heightwise direction when in the deployed configuration.

13 Claims, 4 Drawing Sheets

(56) References Cited

U.S. PATENT DOCUMENTS

| | | | | |
|---|---|---|---|---|
| 4,828,323 | A | 5/1989 | Brodersen et al. | |
| 4,834,449 | A * | 5/1989 | Engelman | A61G 5/10 297/145 |
| 4,944,552 | A * | 7/1990 | Harris | B64D 11/0638 297/145 |
| 5,547,248 | A * | 8/1996 | Marechal | B64D 11/0693 297/188.17 |
| 7,201,439 | B2 | 4/2007 | Schweizer | |
| 7,506,923 | B1 | 3/2009 | Gauss | |
| 8,109,566 | B2 * | 2/2012 | Koh | A47B 83/02 297/145 |
| 8,256,835 | B2 * | 9/2012 | Brink | A47C 7/70 297/145 |
| 8,267,472 | B2 * | 9/2012 | Large | B64D 11/00153 297/145 |
| 8,336,956 | B2 * | 12/2012 | Westerink | B64D 11/0638 297/145 |
| 10,383,434 | B2 * | 8/2019 | Enzinger | B64D 11/0638 |
| 10,399,680 | B2 * | 9/2019 | Veneruso | B64D 11/0646 |
| 10,829,221 | B2 | 11/2020 | Pence | |
| 11,299,274 | B1 | 4/2022 | Davis et al. | |
| 2005/0012375 | A1 | 1/2005 | Giasson | |
| 2005/0194827 | A1 * | 9/2005 | Dowty | B60N 3/06 297/411.3 |
| 2006/0220425 | A1 * | 10/2006 | Becker | A47C 7/70 297/188.16 |
| 2009/0026812 | A1 * | 1/2009 | Figueras Mitjans | A47C 7/70 297/162 |
| 2011/0067606 | A1 * | 3/2011 | Sundarrao | A47C 7/705 108/44 |
| 2012/0032489 | A1 | 2/2012 | Kladde | |
| 2012/0139305 | A1 * | 6/2012 | Baumann | B64D 11/0644 297/411.3 |
| 2013/0234486 | A1 * | 9/2013 | Duus | B60N 2/3065 297/311 |
| 2016/0375810 | A1 * | 12/2016 | Kong | B60N 2/793 297/145 |
| 2018/0339630 | A1 * | 11/2018 | Akaike | B64D 11/0638 |
| 2022/0194284 | A1 * | 6/2022 | Woerz | B64D 11/0638 |
| 2023/0227162 | A1 * | 7/2023 | Satterfield | B64D 11/0638 108/44 |

FOREIGN PATENT DOCUMENTS

| | | | |
|---|---|---|---|
| EP | 3305663 | B1 | 1/2021 |
| WO | 2016018731 | A1 | 2/2016 |

* cited by examiner

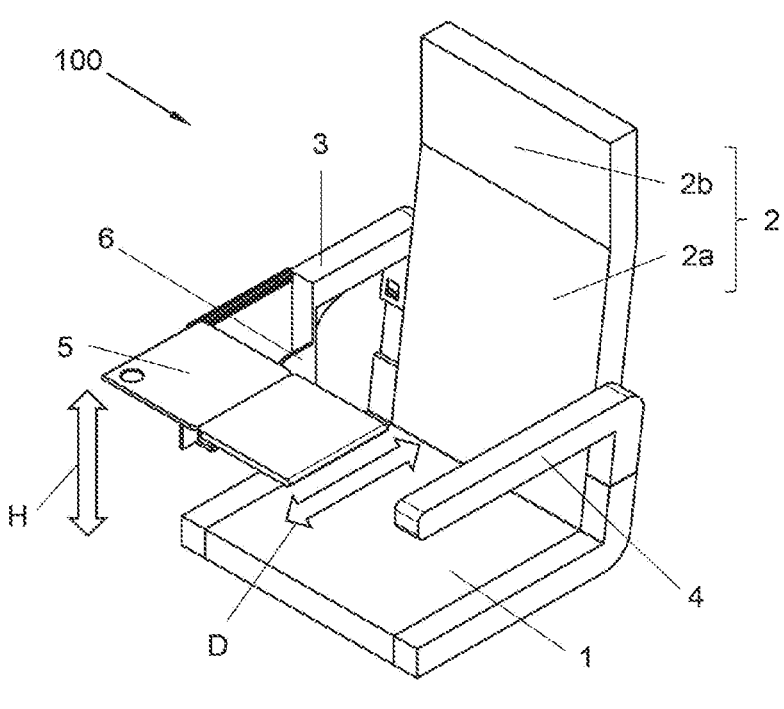
FIG. 1
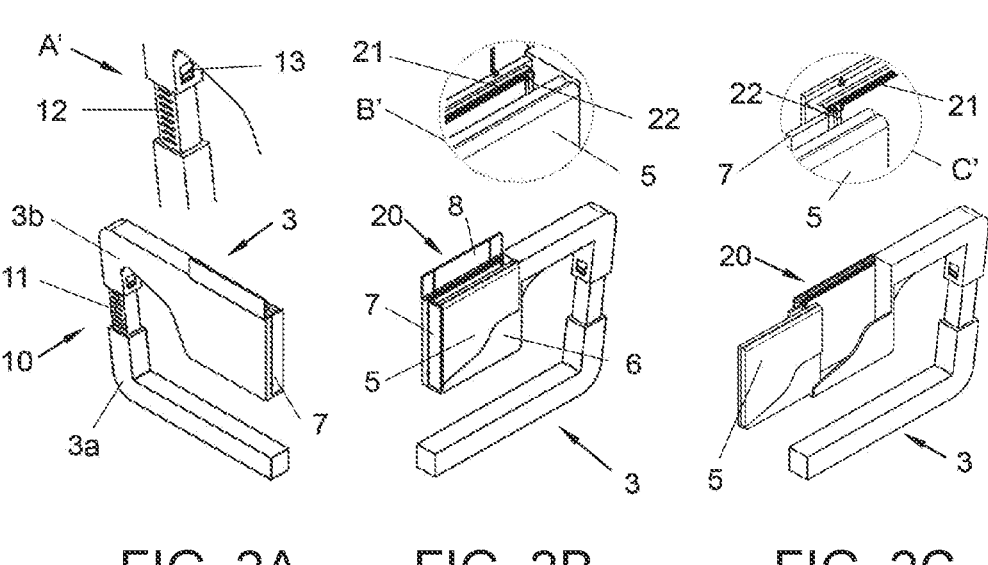
FIG. 2A        FIG. 2B        FIG. 2C

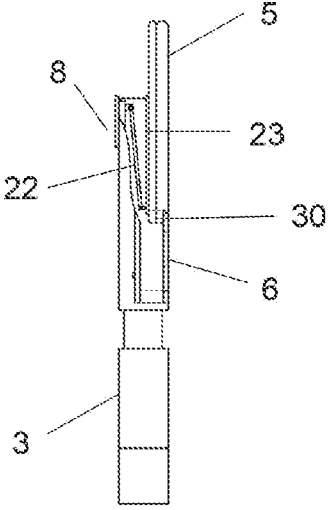
FIG. 3A
FIG. 3B
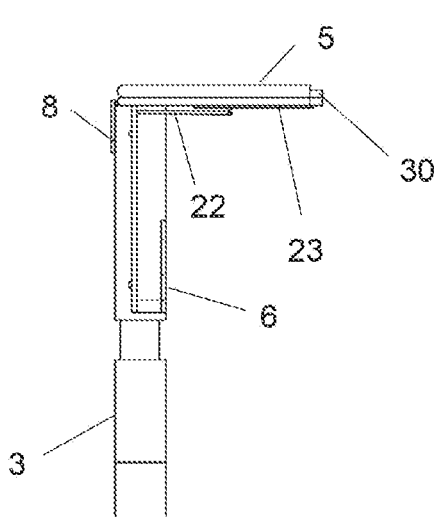
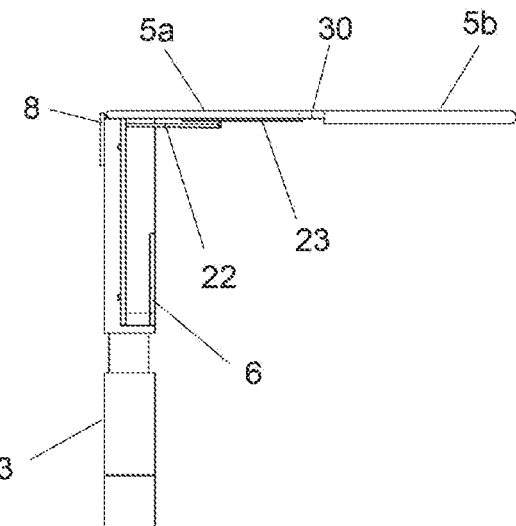
FIG. 3C
FIG. 3D

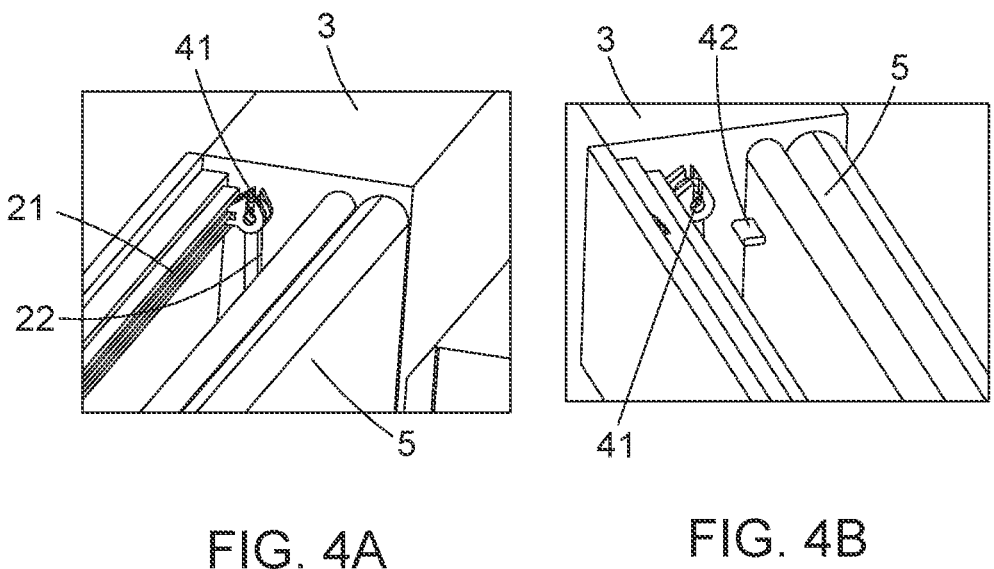
FIG. 4A                    FIG. 4B
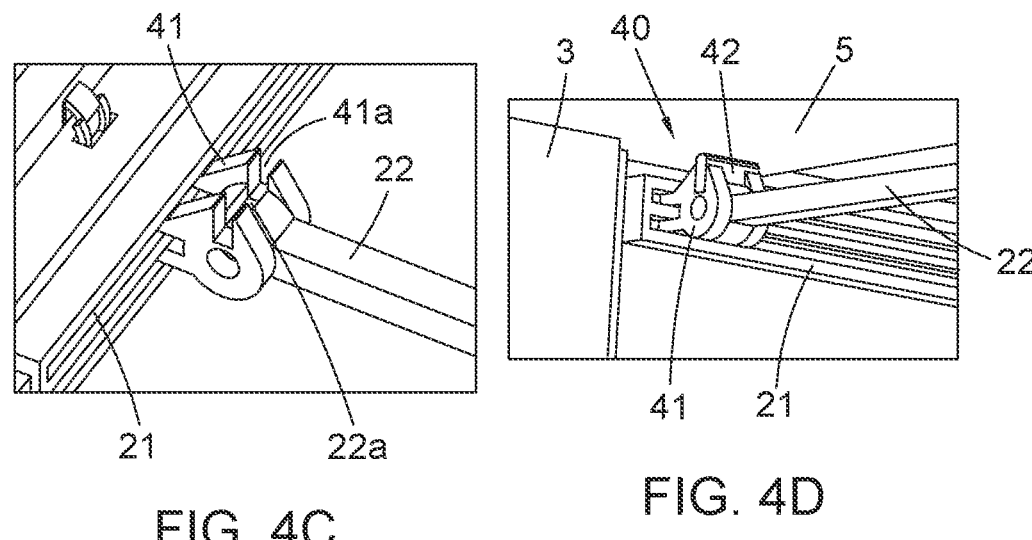
FIG. 4C
FIG. 4D

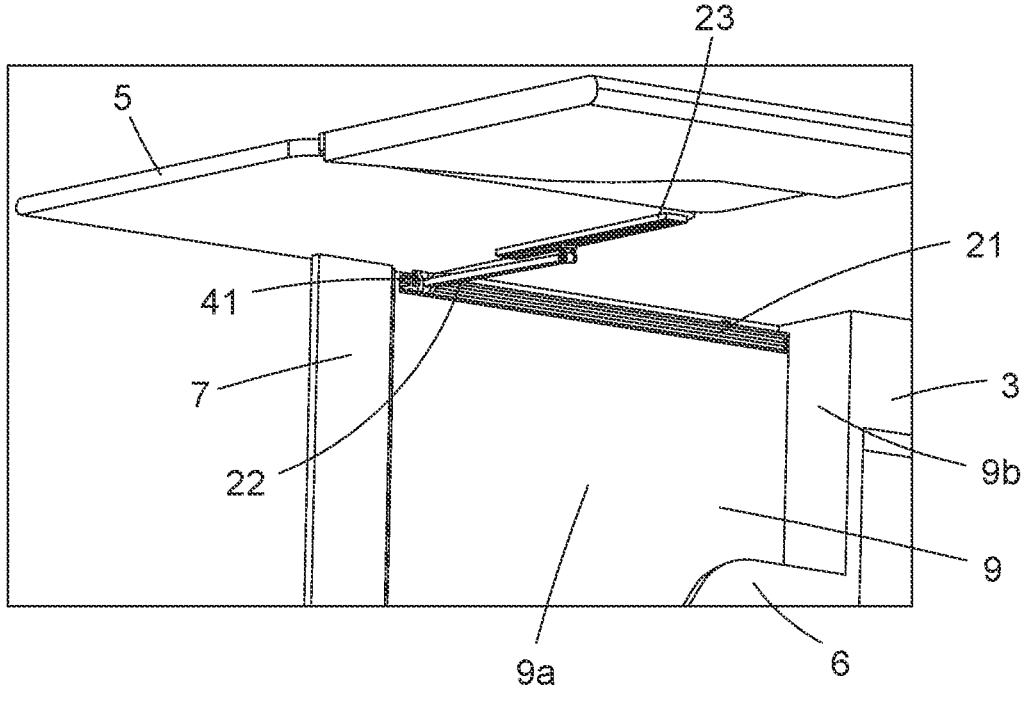
FIG. 5
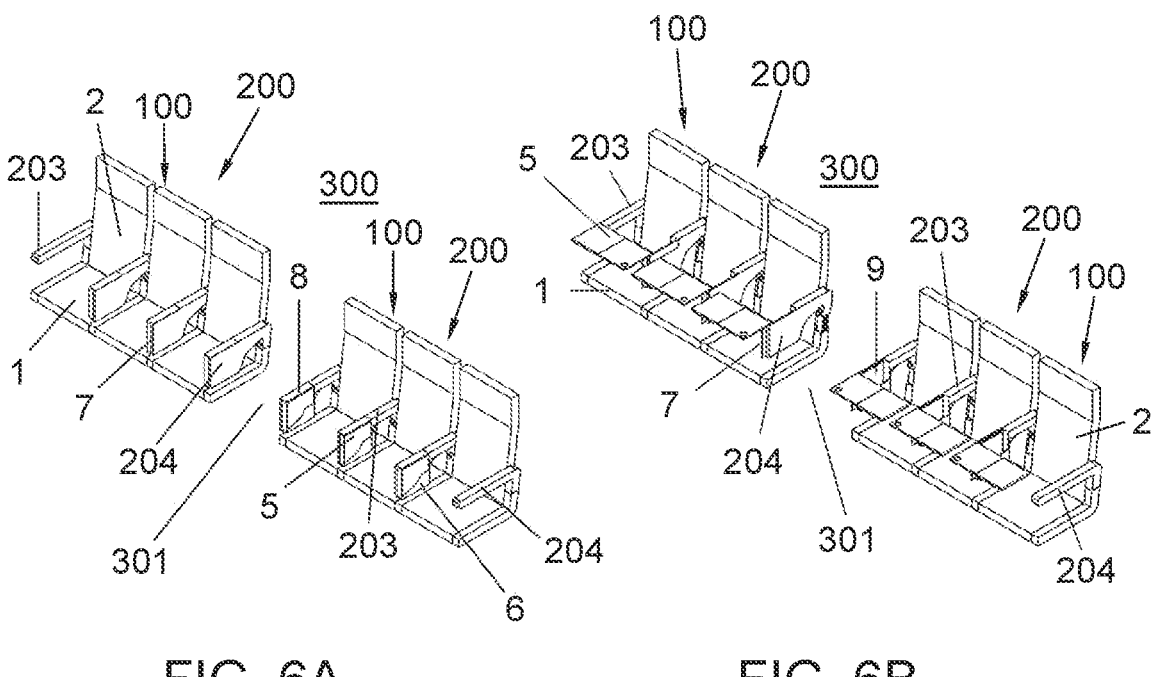
FIG. 6A                    FIG. 6B

PASSENGER SEAT TRAY TABLE

CROSS-REFERENCE TO RELATED APPLICATIONS

The present applications claims the benefit of European Patent Application No. 23151832.5, filed Jan. 16, 2023, which is incorporated herein by reference in the entirety.

TECHNICAL FIELD

The present invention relates to passenger seat tray tables. In particular, a passenger seat assembly for an aircraft, and a method of positioning a tray table of a passenger seat assembly for an aircraft, are contemplated herein.

BACKGROUND

Passenger seats for vehicles such as aircraft, trains or the like are often fitted with features aimed to improve a passenger's comfort during their journey. One such feature is a tray table. In use, a tray table provides a passenger with a flat surface on which they may place a number of objects and, particularly in the case of air travel, have a meal.

Passenger seats for vehicles often have to strike a balance between comfort of the passenger, the durability of the passenger seat, and the compactness of the passenger seat. Since passenger seats will experience use from a great number of passengers during their operational lifetime, passenger seats are often designed with an average consumer or passenger in mind. Accordingly, passenger seats and their specific features, such as tray tables, may not facilitate the comfort of all passengers who use them.

It is desirable to improve a passenger's comfort during their journey.

SUMMARY

Viewed from a first aspect, there is provided a passenger seat assembly for an aircraft comprising: a seat having a front side and a back side separated from one another in a depthwise direction, and a first lateral side and a second lateral side separated from one another in a widthwise direction; and an armrest located at one of the first lateral side or the second lateral side of the seat, the armrest comprising a tray table movable between a stowed configuration and a deployed configuration; wherein a position of the tray table is adjustable, relative to the seat, in the depthwise direction and in a heightwise direction when in the deployed configuration.

The armrest may comprise a heightwise adjustment mechanism configured to control a height of the armrest relative to the seat; and the position of the tray table relative to the seat may be adjustable in the heightwise direction when in the deployed configuration by actuating the height adjustment mechanism of the armrest.

The armrest may comprise a first armrest portion and a second armrest portion coupled by the height adjustment mechanism.

The height adjustment mechanism may be configured to telescopically extend so as to move the second arm portion relative to the first arm portion between a number of discrete positions in the heightwise direction.

The tray table may be slidably attached to the armrest via a sliding rail mechanism extending in the depthwise direction; and the position of the tray table relative to the seat may be adjustable in the depthwise direction when in the deployed configuration by actuating the sliding rail mechanism.

The tray table may be housed in the armrest in the stowed configuration.

The tray table may be configured to be moved from the stowed configuration to the deployed configuration by translating the tray table upwards relative to the seat, and by subsequently rotating the tray table out of the armrest and upwards into the deployed configuration.

The armrest may comprise a cavity configured to house the tray table in the armrest when the tray table is in the stowed configuration.

The armrest may comprise a first releasable cover configured to provide a surface for a passenger arm and to cover the tray table when the tray table is in the stowed configuration; wherein the first releasable cover is configured to be opened when the tray table is to be moved from the stowed configuration to the deployed configuration.

The armrest may comprise a second releasable cover configured to enclose a front side opening of the cavity when the tray table is in the stowed configuration.

The second releasable cover may be configured to automatically open when the tray table is moved in the forward direction.

A supporting arm of the tray table may be rotatably mounted to a mounting member of the armrest.

The tray table may comprise a first locking member configured to engage a second locking member of the mounting member to thereby prevent rotation between the supporting arm and the mounting member when the tray table is in the deployed configuration.

The supporting arm may comprise a third locking member configured to be in rotational alignment with the second locking member only when the tray table is in the deployed configuration; wherein the first locking member is configured to engage the second locking member and the third locking member to thereby prevent rotation between the supporting arm and the mounting member when the tray table is in the deployed configuration.

A width of the tray table may be adjustable when in the deployed configuration. The width of the tray table may be adjustable by action of a folding mechanism.

The folding mechanism may comprise a flexible linear joint formed between a first tray table portion and a second tray table portion.

Viewed from a second aspect, there is provided a bank of passenger seat assemblies, comprising: a plurality of seats each having a front side and a back side separated from one another in a depthwise direction, and a first lateral side and a second lateral side separated from one another in a widthwise direction; and a plurality of armrests, each armrest located at one of the first lateral side or the second lateral side of each seat, each armrest comprising a tray table movable between a stowed configuration and a deployed configuration; wherein a position of each tray table relative to the seat is adjustable in the depthwise direction and a heightwise direction when in the deployed configuration.

The bank of passenger seat assemblies may comprise a passenger seat assembly according to the first aspect, or a plurality of passenger seat assemblies according to the first aspect. Accordingly, the plurality of seats may include the seat(s) or may be a plurality of the seats; and the plurality of armrests may include the armrest(s) or may be a plurality of the armrests.

Viewed from a third aspect, there is provided an aircraft comprising: a cabin having an aisle; and at least one of: a passenger seat assembly according to the first aspect; and a bank of passenger seat assemblies according to the second aspect.

The aircraft may comprise a first bank of passenger seat assemblies located on a port side of the aisle; and a second bank of passenger seat assemblies located on a starboard side of the aisle opposite the port side; wherein the first bank of passenger seat assemblies is the bank of passenger seat assemblies according to the second aspect, wherein each armrest of the plurality of armrests is located on a starboard side of each seat; and wherein the second bank of passenger seat assemblies is a further bank of passenger seat assemblies according to the second aspect, wherein each armrest of the plurality of armrests is located on a port side of each seat.

Viewed from a fourth aspect, there is provided a method of positioning a tray table, wherein the tray table belongs to a passenger seat assembly or a bank of passenger seat assemblies according to any of the preceding aspects, comprising: deploying the tray table from a stowed configuration to the deployed configuration; and adjusting, in the deployed configuration, a height of the tray table relative to the seat and a depth of the tray table relative to the seat.

BRIEF DESCRIPTION OF THE DRAWINGS

Certain exemplary embodiments of the invention are described below by way of example only and with reference to the accompanying drawings in which:

FIG. 1 shows a passenger seat assembly having a tray table;

FIGS. 2A-C each show a perspective view of an armrest of the passenger seat assembly and a detailed view of a feature of the passenger seat assembly, respectively;

FIGS. 3A-D schematically illustrate the tray table moving from a stowed configuration to a deployed configuration;

FIGS. 4A-D show a locking mechanism for retaining the tray table in a deployed configuration;

FIG. 5 shows a perspective view of the underside of the tray table in a deployed configuration;

FIG. 6A shows two banks of passenger seat assemblies each comprising a plurality of seats, with a tray table for each seat in a stowed configuration; and FIG. 6B shows the two banks of passenger seat assemblies of FIG. 6A, with the tray table for each seat in a deployed configuration.

DETAILED DESCRIPTION

FIG. 1 shows a passenger seat assembly 100 comprising a seat 1 having a backrest 2, a first armrest 3 and a second armrest 4. The passenger seat assembly 100 also features a plurality of legs (not shown) that raise the seat 1 off the floor. In other embodiments, a stand or other supporting feature to raise the seat 1 off the floor can equally be employed in place of the legs. The passenger seat assembly 100 of the present embodiment is an aircraft passenger seat assembly, such as for a commercial aircraft. However, it will be readily apparent how the passenger seat assembly 100 may be adapted for use in other vehicles, such as trains, road vehicles or marine vessels.

The seat 1 provides a surface suitable for the passenger to sit on the passenger seat assembly 100. The seat 1 has a front side from which the legs of a passenger will descend when sitting on the chair, and a back side where the backrest 2 meets the seat 1. The backrest 2 comprises a backrest portion 2a and a headrest portion 2b, each suitable for providing support to the passenger's back and head, respectively. The armrests 3, 4 are each located on a lateral side of the seat 1, providing the passenger with an upward-facing surface on which their arms may be supported. The first armrest 3 is located on the right lateral side of the seat 1, and the second armrest 4 is located opposite the first armrest 3, on the left lateral side of the seat 1.

The distance between the front side of the seat 1 and the back side of the seat 1 can be considered as the depth of the seat 1. Thus, any extension or movement extending between the front side of the seat and the back side of the seat 1 can be considered to be in a depthwise direction. Similarly, the distance between the left lateral side of the seat 1 and the right lateral side of the seat 1 can be considered as the width of the seat 1; and any extension or movement extending between the left lateral side of the seat 1 and the right lateral side of the seat 1 can be considered as being in a widthwise direction. Any extension or movement in and/or out of the plane defined by the seat 1 can be considered to be in a heightwise direction.

In general use, the passenger will sit on the passenger seat assembly 100 facing towards the front side, with their back towards the back side of the seat 1. The direction in which the passenger faces is usually a direction of travel of the vehicle in which the passenger seat assembly 100 is situated. The first armrest 3, which is shown on the right lateral side of the seat 1, may thus be referred to as a starboard side armrest 3. The second armrest 4, which is shown on the left lateral side of the seat 1, may similarly be referred to as a port side armrest 4. Appreciably, these terms may be reversed where the passenger seat assembly 100 is situated with the front side of the seat 1 facing in a direction opposite to that of a direction of travel of the vehicle in which the passenger seat assembly 100 is situated.

In the preferred embodiment, each armrest 3, 4 is fixed to the seat 1 on either side of the seat 1. In other embodiments, however, each armrest may be instead fixed to a floor of the vehicle at each side of the seat 1. Thus, the armrests need not necessarily be fixed to the seat: they may be positioned relative to the seat 1.

The first armrest 3 comprises a tray table 5, which is shown in a deployed configuration in FIG. 1. The tray table 5, when in the deployed configuration, extends from the upper surface of the first armrest 3 towards second armrest 4. As such, in use, the tray table 5 will extend across the lap of a passenger when in the deployed configuration. In the deployed configuration, the tray table 5 is configured to provide a flat surface (i.e. a surface parallel to a floor of the vehicle and/or perpendicular to the direction of gravity) on which the passenger may place one or more items. When the tray table 5 is not in use, or not needed, it can be moved to a stowed configuration. The tray table 5 is shown in the stowed configuration in FIG. 6A, for example. Accordingly, the tray table 5 is movable between the stowed configuration and the deployed configuration. In the present embodiment, when in the stowed configuration, the tray table 5 is flush, or housed by, the first armrest 3. The first armrest 3 comprises a guard portion 6, which may serve to protect and retain the tray table 5 when in the stowed configuration.

When in the deployed configuration, the tray table 5 is movable in the depthwise direction and the heightwise direction. The depthwise direction and the heightwise direction are illustrated by arrows D and H respectively, as illustrated in FIG. 1. Accordingly, a passenger may be able to adjust a position of the tray table 5 in the deployed configuration to better accommodate the passenger's needs. For example, a shorter passenger may benefit from reducing the height of the tray table 5 by moving the tray table 5 towards the seat 1; whilst a taller passenger may benefit from increasing the height of the tray table 5 by moving the tray table 5 away from the seat 1. Similarly, a smaller passenger may benefit from moving the tray table 5 towards them, by reducing the depth between the tray table 5 and the backrest 2; whilst a larger passenger may benefit from moving the tray table 5 away from them, by increasing the depth between the tray table 5 and the backrest 2. Therefore, the passenger seat assembly 100 may provide improved comfort and usability for a greater range of passengers.

Whilst in the present embodiment the first armrest 3 is shown comprising the tray table 5 and the second armrest 4 is shown not comprising the tray table 5, in other embodiments the second armrest may comprise the tray table 5 and the first armrest 3 may not comprise the tray table 5. In such embodiments, the construction of the passenger seat assembly 100 is effectively mirrored about the centre of the passenger seat assembly in the widthwise direction.

FIG. 2A shows a perspective view of the first armrest 3, with the tray table 5 in the stowed configuration. In this embodiment, the tray table 5 is stowed in the armrest 3 when in the stowed configuration. The armrest 5 comprises a height adjustment mechanism 10 by which a height of the armrest 3 is adjustable, relative to the seat 1. By adjusting the height of the armrest 3 using the height adjustment mechanism 10, the height of the tray table 5 is also adjusted due to it being fixed to the armrest 3. Therefore, in the deployed configuration, the height of the tray table 5 is adjustable, relative to the seat 1, by actuating the height adjustment mechanism 10.

In the present embodiment, the first armrest 3 comprises a first armrest portion 3a and a second armrest portion 3b. The tray table 5 is mounted to the second armrest portion 3b. The first armrest portion 3a and the second armrest portion 3b are coupled by the height adjustment mechanism 10. In this particular embodiment, the height adjustment mechanism 10 comprises an extension 11 of the first armrest portion 3a to which the second armrest portion 3b is coupled.

The extension 11 comprises a plurality of notches 12, which are each configured to mate with a latch 13 of the second armrest portion 3b, and are shown in closer detail in view A'. The latch 13 can be selectively released by operation of a depressible portion of the latch 13, enabling a passenger to adjust the height of the second armrest portion 3b, and in turn the tray table 5.

In other example embodiments, an alternative heightwise adjustment mechanism can be used. For example, the tray table 5 may be slidably mounted to the armrest portion 3 such that a height of the tray table 5 can be adjusted in the heightwise direction. Additionally or alternatively, the tray table 5 can comprise a hydraulic or motor-controlled actuator to vary a position of the tray table 5 in the heightwise direction, when in the deployed configuration.

FIG. 2B shows another perspective view of the first armrest 3, with the tray table 5 in the stowed configuration. The tray table 5 is fixed to the armrest 3 via a sliding rail mechanism 20, which can be seen in further detail in view B'. The sliding rail mechanism 20 extends along the first armrest 3 in the depthwise direction. By sliding the tray table 5 along the sliding rail mechanism 20, the position of the tray table 5, relative to the seat 1, in the depthwise direction can be adjusted when it is in the deployed configuration.

The sliding rail mechanism 20 comprises a first sliding rail 21, which an arm 22 of the tray table 5 engages. The arm 22 is slidable along the first sliding rail 21, enabling the tray table 5 to be translated along the first sliding rail 21 relative to the armrest 3, to thereby adjust a position of the tray table 5 in the depthwise direction. The sliding rail mechanism 20 of the present embodiment is shown in further detail in FIGS. 4C and 4D.

The length of the first sliding rail 21 limits the range of movement of the tray table 5 in the depthwise direction. The arm 22 is at a rearmost position of the first sliding rail 21 (i.e. towards the back side of the seat 1), such that the tray table 5 is fully contained within the armrest 3.

FIG. 2C shows the first armrest 3 from a similar perspective as in FIG. 2B. The arm 22 is at a forwardmost position of the first sliding rail 21 (i.e. towards the front of the seat 1), such that the tray table 5 is extended forward of the armrest 3 as far as it will go.

Whilst the sliding mechanism 20 of the present embodiment uses a first sliding rail 21, in other embodiments the sliding mechanism may instead use an alternative mechanism. For example, the sliding mechanism could comprise a toothed rack rail and a pinion gear to facilitate translational movement between the tray table 5 and the armrest 3; or a columnar rod to which a sleeve is slidably mounted.

Also, whilst the sliding mechanism 20 of the present embodiment slides the tray table 5 relative to the armrest 3 to adjust the position of the deployed tray table 5 in the depthwise direction, in other embodiments alternative arrangements facilitating the depthwise adjustment of the tray table 5 are contemplated.

In one example embodiment, the armrest 3 may be configured to be adjustable in the depthwise direction relative to the seat 1, thereby adjusting the position of the tray table 5 in the depthwise direction, relative to the seat 1, when in the deployed configuration. For example, the armrest 3 may comprise a static portion fixed relative to the seat 1 and an adjustable portion coupled to the static portion by a depth adjustment mechanism, with the depth adjustment mechanism configured to telescopically extend so as to move the adjustable portion relative to the static portion, e.g. between a number of discrete positions, in the depthwise direction. The depth adjustment mechanism may comprise an extension of the static portion to which the adjustable portion is telescopically mounted. The extension may comprise a plurality of notches, which are each configured to mate with a latch of the adjustable portion, each notch providing a discrete position in which the adjustable portion can be extended relative to the static portion. The latch can be selectively released by operation of a depressible portion of the latch, enabling a passenger to adjust a depthwise extension of the adjustable portion relative to the static portion, and in turn the tray table relative to the seat 1.

In some embodiments, the depthwise adjustment of the armrest may be used in combination with the heightwise adjustment of the armrest 3 as described above. For example, the armrest 3 may comprise a first armrest portion statically fixed relative to the seat 1; a second armrest portion coupled to the first armrest portion as described above, such that the second armrest portion is adjustable in the heightwise direction relative to the first armrest portion; and a third armrest portion coupled to the second armrest portion, such that the third armrest portion is adjustable in the depthwise direction relative to the second armrest portion. The tray table 5 can be mounted to the third armrest portion, such that a height and a depth of the tray table, in the deployed configuration, is controllable by adjusting the second portion in the heightwise direction and the third portion in the depthwise direction, respectively.

FIGS. 3A-D illustrate the movement of the tray table 5 from the stowed configuration, in which the tray table 5 is housed in the first armrest 3, to the deployed configuration, in which the tray table 5 provides a flat surface, according to a preferred embodiment.

As can be seen from the figures, the tray table 5 is movable between the stowed configuration and the deployed configuration by translating the tray table 5 upwards, relative to the seat 1, and by subsequently rotating the tray table 5 out of the first armrest 3 and upwards to the deployed configuration. Thus, the tray table 5 is rotated out and over the seat 1, and upwards to the deployed configuration, without needing to rotate around and over the armrest 3. In other words, the tray table 5 as illustrated in FIGS. 3A-3D, in accordance with the present embodiment, is rotated in a counter-clockwise direction rather than a clockwise direction, as part of its motion between the stowed configuration and the deployed configuration. In other embodiments where the second armrest 4 comprises the tray table 5, the tray table 5 can be moved in a clockwise direction rather than a counter-clockwise direction as it is rotated out and over the seat 1, and upwards to the deployed configuration.

By providing a tray table 5 that is moved from the stowed configuration to the deployed configuration by translating the tray table 5 upwards, relative to the seat 1, and by subsequently rotating the tray table 5 out of the armrest 3 from which it is stowed and upwards to the deployed configuration, the tray table 5 may be more compactly housed in the armrest 3 when in the stowed configuration. For example, since the tray table 5 need only be accessible from the armrest from towards the seat 1, multiple seats may be placed closer together. Additionally, a passenger may deploy the tray table 5 with a reduced risk of disturbing a neighbouring passenger, since the tray table 5 need not pass upwards and over the armrest 3 to be deployed over the seat 1.

The arm 22, which is slidably mounted to the first sliding rail 21 shown in FIGS. 2B and 2C at a first end thereof, is slidably mounted to a second sliding rail 23 at a second end thereof. The second sliding rail 23 is fixed to an underside of the tray table 5. The arm 22, as well as being slidably mounted to each of the first and second sliding rails 21, 23, is rotatably mounted to the first and second sliding rails 21, 23 at each respective end thereof. Accordingly, the first end of the arm 22 is capable of sliding relative to the first sliding rail 21, and is also capable of rotating relative to the first sliding rail 21. The second end of the arm 22 is capable of sliding relative to the second sliding rail 23, and is also capable of rotating relative to the second sliding rail 23.

In the present embodiment, to move the tray table 5 between the stowed configuration and the deployed configuration, firstly the tray table 5 slides upwards in the heightwise direction via a sliding motion between the arm 22 and the second sliding rail 23, as shown in FIG. 3A. The tray table 5 slides upwards such that it clears the guard portion 6. As shown in FIG. 2B, for example, the guard portion 6 has an inclined shape. The guard portion 6 is therefore lower towards the front side. Therefore, before moving upwards, the tray table 5 may be required to slide forwards in the depthwise direction, to help the tray table 5 clear an edge of the guard portion 6.

Secondly, as shown in FIG. 3B, the tray table 5 rotates upwards, for example by pivoting about the first end of the arm 22. The tray table 5 also slides outwards, i.e. towards the opposite lateral side of the seat 1, or towards the second armrest 4, by actuating the sliding mechanism formed by the second sliding rail 23 and the second end of the arm 22.

Finally, as shown in FIG. 3C, the tray table 5 reaches the deployed configuration in which the tray table 5 lies flat, e.g. by pivoting the tray table 5 about the second end of the arm 22. The tray table 5 is maintained in the deployed configuration by securing a locking mechanism, as discussed below and as shown in FIGS. 4C-4D.

Whilst the rotation of the tray table 5 about the first end of the arm 22 and the second end of the arm 22 is described in two separate steps for reasons of clarity, it will be readily appreciated that, in practice, rotation of the tray table 5 out of the armrest 3 and upwards over the seat may be facilitated by rotation of the tray table 5 about the first end and the second end of the arm 22 simultaneously, in one smooth operation.

In other embodiments, the first armrest 3 does not comprise a guard portion 6. The tray table 5 may then be moved upwards, relative to the seat 1, and subsequently rotated out from the armrest 3 and upwards towards the deployed configuration, without needing to slide the tray table 5 forwards in the depthwise direction to assist the tray table 5 in clearing an edge of the guard portion 6.

As shown in FIG. 3D, a width of the tray table 5 is adjustable when in the deployed configuration. In the present embodiment, the tray table 5 comprises a first tray table portion 5*a* and a second tray table portion 5*b*. The second tray table portion 5*b* is joined to the first table portion 5*a* via a folding mechanism 30. The width of the tray table 5 can be adjusted by folding out the second tray table portion 5*b*.

By providing a tray table 5 that is adjustable in width, in addition to its position being adjustable in the heightwise direction and the depthwise direction, the passenger may be able to further adjust the tray table 5 to better accommodate the passenger's needs.

The folding mechanism 30 of the present embodiment comprises a linear joint formed between the first tray table portion 5*a* and the second tray table portion 5*b*, the linear joint comprising a flexible portion. In other embodiments, however, the folding mechanism 30 can comprise any mechanism that facilitates a folding motion between the first tray table portion 5*a* and the second tray table portion 5*b*, such as one or more hinge joints or the like. The folding mechanism 30 of the present embodiment provides cantilevered support to the second tray table portion 5*b* when deployed. In other embodiments, the second tray table portion 5*b* can be supported by the second armrest 4.

Using a folding mechanism 30 to adjust a width of the tray table 5 may enable a passenger to select a size of the tray table 5 as desired when in the deployed configuration, whilst also enabling the tray table 5 to be housed in the first armrest 3 in a compact manner when in the stowed configuration.

Whilst a folding mechanism 30 is employed in the present embodiment, in other embodiments the second tray table portion 5*b* may be telescopically mounted, or slidably mounted, to the first tray table portion 5*a* to facilitate an adjustment of the width of the tray table 5 in the deployed configuration.

In other embodiments a position of the tray table 5 may be additionally or alternatively adjusted in the widthwise direction. For example, the first tray table portion 5*a* may be capable of being slid in the widthwise direction, e.g. via actuating the arm 22 relative to the second sliding rail 23, to adjust a position of the tray table 5 in the widthwise direction. Alternatively, the tray table 5 may comprise only the first tray table portion 5*a*, with the first tray table portion 5*a* being translatable relative to the seat 1 in the widthwise direction, such that a position of the tray table 5 is adjustable in the widthwise direction, when the tray table 5 is in the deployed configuration.

FIGS. 4A-D each show a perspective view of the first armrest 3 and the tray table 5, and in particular show a locking mechanism 40 for retaining the tray table 5 in the deployed configuration.

FIG. 4A shows the tray table 5 in the stowed configuration. As discussed above, the first end of the arm 22 is slidably and rotatably coupled to the first sliding rail 21. To facilitate this range of motion, a mounting member 41 is slidably coupled to the first sliding rail 21, and the first end of the arm 22 is rotatably coupled to the mounting member 41. Thus, indirectly via the mounting member 41, the arm 22 is slidably and rotatably coupled to the first sliding rail 21.

As shown in FIG. 4B, the underside of the tray table 5 is provided with a first locking member 42. The first locking member 42 is a protrusion extending from the underside of the tray table 5.

FIG. 4C shows the mounting member 41 and the first end of the arm 22 in further detail. The mounting member 41 comprises a second locking member 41*a* which, in the present embodiment, is a first groove, and the arm 22 comprises a third locking member 22*a* which, in the present embodiment, is a second groove located at the first end of the arm 22. When the tray table 5 is in the stowed configuration, the second locking member 41*a* and the third locking member 22*a* are misaligned. However, as the tray table 5 moves from the stowed configuration to the deployed configuration, as discussed above, the arm 22 rotates relative to the mounting member 41. When the tray table 22 is in the deployed configuration, the second locking member 41*a* and the third locking member 22*a* are configured to align.

FIG. 4D shows the locking mechanism 40 in a locked configuration. In the locked configuration, the first locking member 42 engages the second locking member 41*a* and the third locking member 22*a*, i.e. by engaging the channel provided by the first groove and the second groove when aligned. The first locking member 42 engages the second locking member 41*a* and the third locking member 22*a* via an interference fit, with lateral faces of the first locking member 42 preventing the second locking member 41*a* and the third locking member 22*a* from misaligning. Therefore, when in the locked configuration, the locking mechanism 40 prevents the arm 22 from rotating about the mounting member 41. In other words, the locking mechanism 40 is arranged to provide a releasable cantilever support for the tray table 5 when it is in the deployed configuration. In this manner, the arm 22 can be referred to as a supporting arm 22, since it provides the necessary support to maintain the tray table 5 in the deployed configuration.

In the present embodiment, the arm 22 of the tray table 5 is rotatably mounted to the mounting member 41 of the first armrest 3, and the third locking member 22*a* of the arm 22 is configured to align with the second locking member 41*a* of the armrest 3 only when the tray table 5 is in the deployed configuration. This may ensure a passenger correctly moves the tray table 5 to the deployed configuration before being able to engage the locking mechanism 40.

Whilst in the present embodiment the locking mechanism 40 comprises the mounting member 41 and the locking member 42, in other embodiments alternative locking mechanisms are contemplated. For example, in other embodiments, the locking mechanism 40 may only comprise the first locking member 42 and the second locking member 41*a*. In other embodiments, the tray table 5 may comprise a groove as the second locking member, and the mounting member 41 and optionally the arm 22 may comprise protrusions as the first and third locking members respectively, arranged to engage the groove in the deployed configuration. In other embodiments, the armrest 3 may comprise a collapsible bracket or support member configured to be flush with the armrest 3 when the tray table 5 is in the stowed configuration, and configured to be extended when the tray table 5 is in the deployed configuration. When extended, the collapsible bracket or support member may provide a surface on which the tray table 5 can rest.

FIG. 5 shows the tray table 5 in the deployed configuration, viewed from the underside of the tray table 5. When in the stowed configuration, the tray table 5 is housed in the first armrest 3 in the present embodiment.

By housing the tray table 5 in the armrest 3, the tray table 5 may be more compactly arranged when stowed, such that the overall passenger seat assembly 100 can be made smaller. Additionally, the tray table 5 may be better protected by the armrest 3 from damage when stowed, for example if a passenger were to knock or impact the tray table 5 when passing, sitting on, or vacating, the seat 1.

The armrest 3 defines a cavity 9 in which the tray table 5 is stowed. The cavity 9 is bounded by the armrest 3 on a first lateral side 9*a*, a back side 9*b*, and on a bottom side (not shown). The lateral side opposite to the second lateral side 9*a* is bounded at least partially by the guard portion 6. The front side and the top side of the cavity 9 are each bounded by releasable covers 7, 8. When the tray table 5 is moved from the stowed configuration to the deployed configuration, each of the releasable covers 7, 8 are opened such that movement of the tray table 5 is not restricted by the presence of the covers 7, 8. The provision of releasable covers 7, 8 may protect the tray table 5 and its respective adjustment mechanisms from damage when the tray table 5 is in the stowed configuration (e.g. when not in use).

A front side releasable cover 7 bounds the front side of the cavity 9, and a top side releasable cover 8 bounds the top side of the cavity 9. When the tray table 5 is in the stowed configuration, each of the releasable covers 7, 8 are closed. When the top side releasable cover 8 is closed, the top side releasable cover 8 provides a surface on which a passenger may rest their arm.

In the present embodiment, the top side releasable cover (8) is manually opened by sliding the cover 8 around the side of the armrest 3, i.e. down the back side of the first lateral side 9*a* (see FIGS. 3A-3D, for example). In other embodiments, the top side releasable cover 8 is opened manually, for example by pressing a button to release a latch keeping the cover 8 in place, with the cover 8 resiliently biased to be in the open position; or by pulling a handle of the cover 8 and manually moving the cover 8 to the open position.

In the present embodiment, the front side releasable cover 7 is configured to automatically open when the tray table 5 is moved in the forward direction. The tray table 5 pushes the releasable cover 7 to automatically open it. In other embodiments, movement of the tray table 5 in the forward direction triggers an automatic opening mechanism arranged to open the front side releasable cover 7.

In other embodiments, the front side releasable cover 7 is resiliently biased to be in the open position, for example by a spring mechanism. The front side releasable cover 7 is maintained in the closed position by the top side releasable cover 8, by a groove or slot of the top side releasable cover 8 in which the front side releasable cover 7 is retained. The top side releasable cover 8 therefore has to be closed for the front side releasable cover 7 to be maintained in the closed position. By having the front side releasable cover 7 automatically open when the top side releasable cover 8 is opened, a passenger may more readily access the tray table 5.

In some embodiments, the armrest 3 may comprise only the top side releasable cover 8, and the front side of the cavity may be bounded by a permanent wall of the armrest 3. This may be the case where the tray table 5 does not need to move in the depthwise direction to assist with clearing e.g. a guard portion 6.

In other embodiments, the tray table 5 can be fixed to an outer surface of the armrest 3 such that it simply sits against the surface of the armrest 3 when in the stowed configuration, rather than be housed in the armrest 3 when stowed.

FIG. 6A shows two banks 200 of passenger seat assemblies 100, each bank 200 comprising a plurality of seats 1 located either side of an aisle 301, e.g. in a cabin of an aircraft 300 or another vehicle. Each of the seats 1 and the armrests 203, 204 have a construction as described above. Whilst each bank 200 of passenger seat assemblies 100 is shown having three passenger seat assemblies 100, in other embodiments each bank 200 may comprise two passenger seat assemblies, or four or more passenger seat assemblies 100.

A first plurality of the seats 1 are located on a first lateral side of an aisle 301, and a second plurality of the seats 1 are located on a second lateral side of the aisle 301, opposite the first lateral side of the aisle 301. Each seat 1 comprises an armrest 203, 204. The armrest 203, 204 closest to the aisle 301 for each seat 1 comprises a tray table 5, as discussed above. As seen in FIG. 6A, each of the tray tables 5 are in the stowed configuration. In comparison, as seen in FIG. 6B, each of the tray tables 5 are in the deployed configuration. On each seat 1 located furthest from the aisle 301, there is provided an armrest 203, 204 not comprising a tray table 5 on the lateral side of the seat 1 furthest from the aisle 301.

The side walls of the cabin of the aircraft 300 are normally arcuate, and internally concave. Accordingly, a heightwise clearance of the cabin may be reduced towards the side walls. By placing the tray tables 5 on the armrests 203, 204 closest to the aisle, no tray tables 5 need be provided for the armrests 203, 204 located next to a side wall of the cabin of the aircraft 300. According, the tray table 5 of both the most port side seat of the port side seat bank 200 and the most starboard side seat 1 of the starboard side seat bank 200 may be able to freely extend in the heightwise direction (e.g. during deployment or during adjustment of the tray table 5 in the deployed configuration) without its movement being restricted by the side wall of the cabin of the aircraft 300.

The invention claimed is:

1. A passenger seat assembly for an aircraft comprising:
 a seat having a front side and a back side separated from one another in a depthwise direction, and a first lateral side and a second lateral side separated from one another in a widthwise direction; and
 an armrest located at one of the first lateral side or the second lateral side of the seat, the armrest comprising a tray table movable between a stowed configuration and a deployed configuration,
 wherein a position of the tray table is adjustable, relative to the seat, in the depthwise direction and in a heightwise direction when in the deployed configuration,
 wherein the tray table is housed in the armrest in the stowed configuration,
 wherein the armrest comprises a cavity configured to house the tray table in the armrest when the tray table is in the stowed configuration, wherein the armrest comprises a first releasable cover configured to provide a surface for a passenger arm and to cover the tray table when the tray table is in the stowed configuration,
 wherein the first releasable cover is configured to be opened when the tray table is to be moved from the stowed configuration to the deployed configuration,
 wherein the armrest comprises a second releasable cover configured to enclose a front side opening of the cavity when the tray table is in the stowed configuration,
 wherein the second releasable cover is configured to automatically open when the tray table is moved in a forward direction.

2. The passenger seat assembly as claimed in claim 1, wherein the armrest comprises a height adjustment mechanism configured to control a height of the armrest relative to the seat; and
 wherein the position of the tray table relative to the seat is adjustable in the heightwise direction when in the deployed configuration by actuating the height adjustment mechanism of the armrest.

3. The passenger seat assembly as claimed in claim 2, wherein the armrest comprises a first armrest portion and a second armrest portion coupled by the height adjustment mechanism;
 wherein the height adjustment mechanism is configured to telescopically extend so as to move the second armrest portion relative to the first armrest portion between a plurality of discrete positions in the heightwise direction.

4. The passenger seat assembly as claimed in claim 1, wherein the tray table is slidably attached to the armrest via a sliding rail mechanism extending in the depthwise direction; and
 wherein the position of the tray table relative to the seat is adjustable in the depthwise direction when in the deployed configuration by actuating the sliding rail mechanism.

5. The passenger seat assembly as claimed in claim 1, wherein the tray table is configured to be moved from the stowed configuration to the deployed configuration by translating the tray table upwards relative to the seat, and by subsequently rotating the tray table out of the armrest and upwards into the deployed configuration.

6. The passenger seat assembly as claimed in claim 1, wherein a supporting arm of the tray table is rotatably mounted to a mounting member of the armrest,
 wherein the tray table comprises a first locking member configured to engage a second locking member of the mounting member to thereby prevent rotation between the supporting arm and the mounting member when the tray table is in the deployed configuration.

7. The passenger seat assembly as claimed in claim 6, wherein the supporting arm comprises a third locking member configured to be in rotational alignment with the second locking member only when the tray table is in the deployed configuration; and
 wherein the first locking member is configured to engage the second locking member and the third locking member to thereby prevent rotation between the supporting arm and the mounting member when the tray table is in the deployed configuration.

8. The passenger seat assembly as claimed in claim 1, wherein a width of the tray table is adjustable when in the deployed configuration.

9. The passenger seat assembly as claimed in claim 8, wherein the width of the tray table is adjustable by action of a folding mechanism.

10. The passenger seat assembly as claimed in claim 9, wherein the folding mechanism comprises a flexible linear joint formed between a first tray table portion and a second tray table portion.

11. A bank of passenger seat assemblies comprising:

a plurality of seats, each having a front side and a back side separated from one another in a depthwise direction, and a first lateral side and a second lateral side separated from one another in a widthwise direction; and a plurality of armrests, each armrest located at one of the first lateral side or the second lateral side of each seat of the plurality of seats, each armrest comprising a tray table movable between a stowed configuration and a deployed configuration, wherein a position of each tray table relative to each seat is adjustable in the depthwise direction and a height-wise direction when in the deployed configuration, wherein the tray table is housed in each armrest in the stowed configuration, wherein each armrest comprises a cavity configured to house the tray table in each armrest when the tray table is in the stowed configuration, wherein each armrest comprises a first releasable cover configured to provide a surface for a passenger arm and to cover the tray table when the tray table is in the stowed configuration, wherein the first releasable cover is configured to be opened when the tray table is to be moved from the stowed configuration to the deployed configuration, wherein each armrest comprises a second releasable cover configured to enclose a front side opening of the cavity when the tray table is in the stowed configuration, wherein the second releasable cover is configured to automatically open when the tray table is moved in a forward direction.

12. An aircraft cabin comprising:

an aisle; and

14 one or more passenger seat assemblies, each passenger seat assembly comprising:

a seat having a front side and a back side separated from one another in a depthwise direction, and a first lateral side and a second lateral side separated from one another in a widthwise direction; and an armrest located at one of the first lateral side or the second lateral side of the seat, the armrest comprising a tray table movable, wherein a position of the tray table is adjustable, relative to the seat, in the depthwise direction and in a height-wise direction when in the deployed configuration, wherein the tray table is housed in the armrest in the stowed configuration, wherein the armrest comprises a cavity configured to house the tray table in the armrest when the tray table is in the stowed configuration, wherein the armrest comprises a first releasable cover configured to provide a surface for a passenger arm and to cover the tray table when the tray table is in the stowed configuration, wherein the first releasable cover is configured to be opened when the tray table is to be moved from the stowed configuration to the deployed configuration, wherein the armrest comprises a second releasable cover configured to enclose a front side opening of the cavity when the tray table is in the stowed configuration, wherein the second releasable cover is configured to automatically open when the tray table is moved in a forward direction.

13. The aircraft cabin as claimed in claim 12, wherein the one or more passenger seat assemblies comprise a first bank of passenger seat assemblies located on a port side of the aisle; and a second bank of passenger seat assemblies located on a starboard side of the aisle opposite the port side;

wherein each armrest is located on a starboard side of each seat; and wherein each armrest is located on a port side of each seat.

* * * * *